United States Patent
Milford et al.

(10) Patent No.: US 11,669,859 B2
(45) Date of Patent: Jun. 6, 2023

(54) REAL-TIME ADVERTISEMENT-INSERTION VERIFICATION

(71) Applicant: ARRIS Enterprises LLC, Suwanee, GA (US)

(72) Inventors: Matthew A. Milford, Waxhaw, NC (US); Xavier P. Denis, Beaverton, OR (US); David A. Romrell, Hillsboro, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 191 days.

(21) Appl. No.: 16/284,538

(22) Filed: Feb. 25, 2019

(65) Prior Publication Data

US 2019/0266632 A1 Aug. 29, 2019

Related U.S. Application Data

(60) Provisional application No. 62/634,322, filed on Feb. 23, 2018.

(51) Int. Cl.
*G06Q 30/00* (2023.01)
*G06Q 30/0241* (2023.01)
(Continued)

(52) U.S. Cl.
CPC ..... *G06Q 30/0248* (2013.01); *G06Q 30/0241* (2013.01); *G06Q 30/0272* (2013.01); *H04N 21/812* (2013.01)

(58) Field of Classification Search
CPC ........... G06Q 30/0248; G06Q 30/0241; G06Q 30/0272; H04N 21/812; H04N 21/222; H04N 21/23424; H04N 21/23418
(Continued)

(56) References Cited

U.S. PATENT DOCUMENTS

| 2002/0083439 A1* | 6/2002 | Eldering | H04N 7/17363 |
| | | | 725/32 |
| 2008/0098423 A1* | 4/2008 | Malik | H04N 21/23424 |
| | | | 725/34 |

(Continued)

OTHER PUBLICATIONS

H. T. Le, Nam Pham Ngoc, A. T. Pham and T. C. Thang, "Adaptive video streaming with smooth advertisement insertion," 2014 IEEE Fifth International Conference on Communications and Electronics (ICCE), 2014, pp. 162-167, doi: 10.1109/CCE.2014.6916697. (Year: 2014).*

(Continued)

*Primary Examiner* — Sun M Li
(74) *Attorney, Agent, or Firm* — Chernoff, Vilhauer, McClung & Stenzel, LLP

(57) ABSTRACT

Methods, systems, and computer readable media can be operable to facilitate real-time advertisement verification. Advertisement media may be tagged with one or more tag identifiers. One or more remote probes may retrieve tag identifier(s) from advertisement media and output tag information to a centralized verification system. The centralized verification system may compare tag information retrieved from remote probes to expected advertisement placement parameters. The centralized verification system may verify that appropriate advertisement media has been spliced into expected channels or streams. When a splicing error has been detected, the centralized verification system may initiate changes to correct the splicing error.

20 Claims, 10 Drawing Sheets

(51) Int. Cl.
*G06Q 30/0272* (2023.01)
*H04N 21/81* (2011.01)

(58) Field of Classification Search
USPC ..................................................... 705/14.47
See application file for complete search history.

(56) References Cited

U.S. PATENT DOCUMENTS

| | | |
|---|---|---|
| 2011/0102600 A1 | 5/2011 | Todd |
| 2014/0100948 A1 | 4/2014 | Netzer et al. |
| 2014/0173651 A1 | 6/2014 | Mathews et al. |
| 2015/0334433 A1 | 11/2015 | Zeigler et al. |

OTHER PUBLICATIONS

R. Seeliger, D. Silhavy, S. Pham and S. Arbanowski, "Cross-platform ad-insertion using HbbTV and MPEG-DASH," 2016 Asia Pacific Conference on Multimedia and Broadcasting (APMediaCast), 2016, pp. 7-13, doi: 10.1109/APMediaCast.2016.7878174. (Year: 2016).*

PCT International Search Report & Written Opinion, Re: Application No. PCT/US2019/019412, dated May 6, 2019.

* cited by examiner

US 11,669,859 B2

REAL-TIME ADVERTISEMENT-INSERTION VERIFICATION

CROSS REFERENCE TO RELATED APPLICATION

This application is a non-provisional application claiming the benefit of U.S. Provisional Application Ser. No. 62/634,322, entitled "Real-Time Ad-Insertion Verification," which was filed on Feb. 23, 2018, and is incorporated herein by reference in its entirety.

TECHNICAL FIELD

This disclosure relates to verification of real-time advertisement-insertion.

BACKGROUND

Service providers have advertisement verification problems across their current live/linear television network. Problems can occur when the network is not properly configured for a local market. For example, a network local affiliate channel brought in via a national feed may not be routed through an ad-splicer correctly and there can be IP-multicast and QAM network configuration issues. When the network or the ad-splicer are not configured correctly, an incorrect or missed ad-splice can occur. In some scenarios, an ad splice can occur on the wrong channel or an incorrect advertisement can be spliced in for the market being served. Currently, most service providers manually spot check network configuration and ad splicing. This is very time consuming and is done via a remote set top box.

Additionally, the ad splice configuration must be manually aligned with each edge network location to ensure the ad-splice start and end points align with the live/linear stream timing. Without this being done the ad-splices will not align properly with the ad insert window, and the ad-splices may overlap programming content. Improper ad splices can have a high cost to service providers. Missed or incorrect ad splices can equate to significant lost revenue, and some ad placement opportunities cannot be recovered once they are missed (e.g., such as ad placements on live sporting events).

Currently there are very expensive video quality analysis systems that have many features that make them problematic for use in this problem space. Additionally, due to the cost, most verifications are done via antiquated and human resource time intensive means. Therefore, a need exists for improved methods and systems for verifying appropriate placement of advertisement media.

BRIEF DESCRIPTION OF THE DRAWINGS

Like reference numbers and designations in the various drawings indicate like elements.

DETAILED DESCRIPTION

It is desirable to improve upon methods and systems for verifying appropriate placement of advertisement media. Methods, systems, and computer readable media can be operable to facilitate real-time advertisement verification. Advertisement media may be tagged with one or more tag identifiers. One or more remote probes may retrieve tag identifier(s) from advertisement media and output tag information to a centralized verification system. The centralized verification system may compare tag information retrieved from remote probes to expected advertisement placement parameters. The centralized verification system may verify that appropriate advertisement media has been spliced into expected channels or streams. When a splicing error has been detected, the centralized verification system may initiate changes to correct the splicing error.

A real-time advertisement verification system is described herein and may enable electronic verification and manual review of advertisement splices. This may be done by first electronically tagging the advertisement media so that when the media is inserted into live/linear streams at the edge of the network, the advertisement media can be identified and verified. Additionally, the network configuration mapping to local ad-zone variants of live/linear channels or streams may be used to ensure the expected channel with localized advertisement media inserted are routed into the appropriate downstream IP (Internet protocol)-multicasts/QAMs (quadrature amplitude modulators). The system may also include remote probes deployed at the edge of the network what will capture portions of the live/linear streams around the ad-splice. These captures may be sent back to a centralized module of the advertisement verification system that will allow manual and electronic verification of the ad splices.

Figure 1:
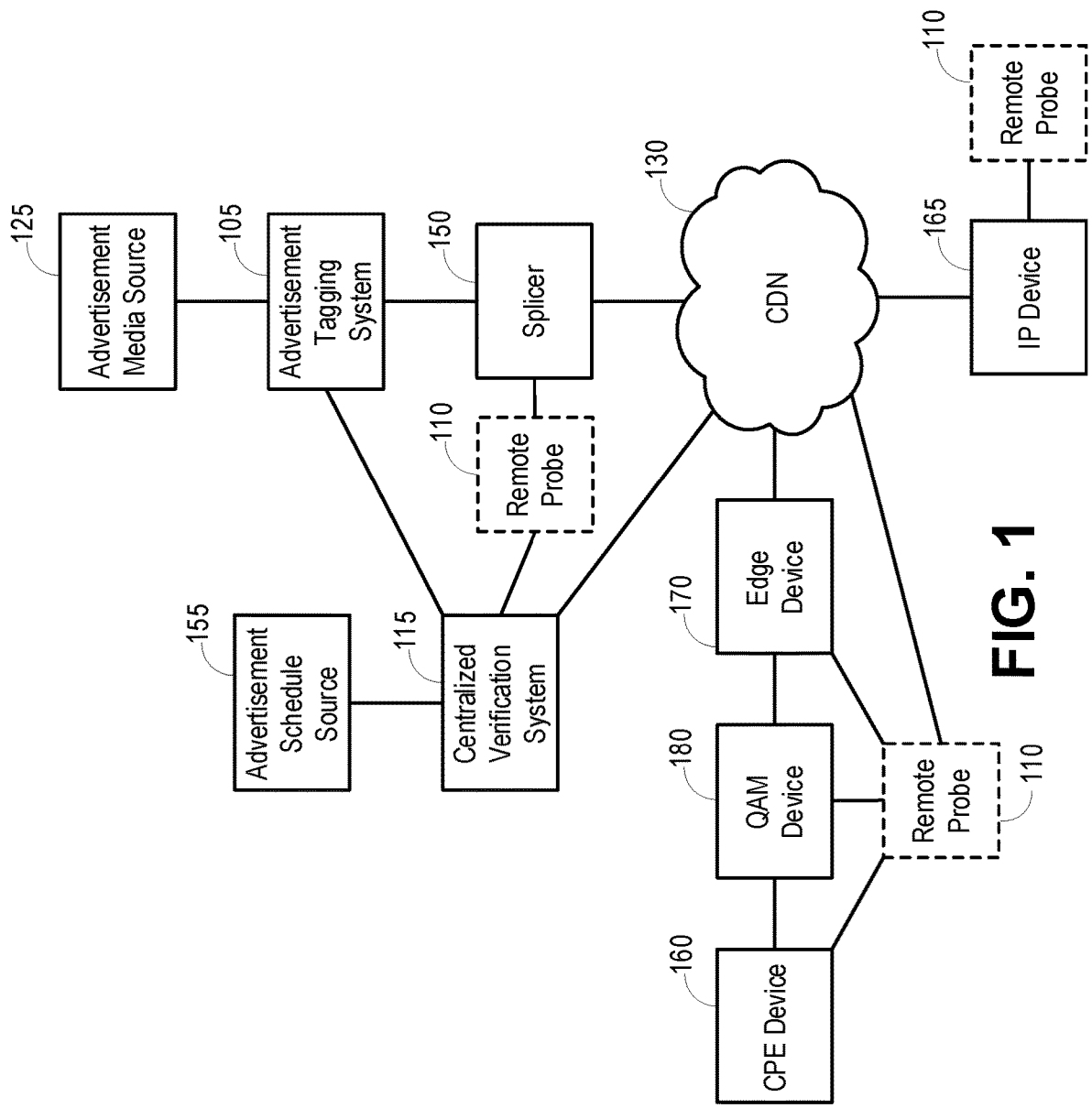
FIG. 1 is a block diagram illustrating an example network environment operable to facilitate real-time advertisement verification.

FIG. 1 is a block diagram illustrating an example network environment 100 operable to facilitate real-time advertisement verification.

In embodiments, real-time advertisement verification may be carried out by a real-time advertisement verification system (RT-AVS). The RT-AVS may include an advertisement tagging system 105, one or more remote probes 110, and a centralized verification system 115.

In embodiments, the advertisement tagging system 105 may insert one or more tag identifiers in retrieved advertisement media. The one or more tag identifiers may be detected by one or more downstream elements (e.g., remote probe(s) 110), and the one or more tag identifiers may be used to electronically profile the advertisement media. The one or more tag identifiers may be used by the centralized verification system 115 to identify the advertisement content carrying the tag identifier(s). The advertisement tagging system 105 may carry out the tagging of the advertisement media according to one or more various tagging methods, including, but not limited to the following methods:

- Tagging may be done at fields in IP (Internet protocol) stream headers/framing and presumes extraction at IP receiver (DSCP (differentiated services code point), VLAN (virtual local area network), IP options, UDP (user datagram protocol), extra framing, etc.)
- Tagging may be done at fields in MPEG (moving picture experts group) stream framing and checked along path or at the decoder (PID (packet identifier) inband signaling, etc.)
- Tagging may be encoded into the media (closed caption, watermarked in audio or video—preserved through transcode and recording systems)
- Tags may be present at periodic intervals in a stream or be present only during the targeted advertisement media inserted into the stream Tag identifiers may distinguish between the available stream source and potential paths, and the tag identifiers may be generated for multiple dimensions. For example, the one or more tag identifiers include an identification of a content source (e.g., network feed, etc.), traditional geographic/regional delivery (e.g., zones, zip, service-groups or nodes, etc.), targeting profiles (e.g., demographics, client types, etc.), particular stream workflow (e.g., provided by vendor A/B, resiliency path A/B, as it goes through a multiplexer or other device), and/or other parameters.

In embodiments, a remote probe 110 may receive scheduled capture requests on a connected IP (Internet protocol)-multicast. A remote probe 110 may connect to IP-multicasts and record the MPEG transport streams for a requested start time and end time as instructed by the scheduled capture request. A remote probe 110 may create capture files for the advertisement splices, cache them for a small period of time, and forward them to the centralized verification system 115. In embodiments, a remote probe 110 may also allow for one or more STB (set-top box) inputs with IR (infrared radiation) controls that may tune the STB(s) as needed and capture the output. Remote probes 110 may be placed in various locations along the content delivery stream and in various devices. Remote probe 110 placements may include, but are not limited to:

- Probes in the requests to servers for playback (requests to a packager, advertisement media source 125, CDN (content delivery network) 130, manifest controller (e.g., manifest manipulator), proxy, etc.)
- Probes in transport and delivery equipment along a delivery path (multiplexer, splicer 150, encryption, switches, tuners, etc.)
- Probes in recorders
- Probes in players
- Probes again in any downstream copies/replay (e.g., identify illegal upload that uses tags to determine source and path)

In embodiments, a tag identifier may include one or more callbacks that are to be used by active remote probes 110. For example, the one or more callbacks may include an identifier (e.g., URI (uniform resource identifier)) for a beacon that includes parameters or meta information of the one or more tag identifiers. An active remote probe 110 may be configured with a callback server, wherein the active remote probe 110 provides specific tag information to the callback server. In embodiments, a stream received and/or tag identifier that is received by a remote probe 110 may include an identification of a server that is requesting active beacons upon reception of a tag identifier.

In embodiments, a remote probe 110 may be configured to log events and report information gathered from tag identifiers. For example, the remote probe 110 may collect information retrieved from tag identifiers for later analysis and/or alerting.

In embodiments, a passive remote probe 110 may receive and hold tag identifiers. The tag identifiers held by the passive remote probe 110 may be queried or displayed in a user interface (UI) upon request.

In embodiments, a deferred or offline remote probe 110 may perform an inspection or query of any recordings of the received stream and/or advertisement media.

In embodiments, tag identifiers captured along a path or within a region may be aggregated. For example, a count and/or list of common tag identifiers captured along a path or within a region may be maintained.

In embodiments, the centralized verification system 115 may receive advertisement tag/profile information, advertisement scheduling information (e.g., advertisement splice schedules), and network configuration information from the advertisement tagging system 105 and/or an advertisement schedule source 155. The centralized verification system 115 may receive the captured tag identifiers and/or advertisement splice media files from the one or more remote probes 110.

The centralized verification system 115 may then electronically verify that appropriate advertisements were spliced into expected live/linear channels. In embodiments, the centralized verification system 115 may enable manual review and verification of advertisement splicing. For example, the centralized verification system 115 may generate and output a display showing the embedded SCTE-35 markers, embedded timecode, video and audio. In embodiments, the centralized verification system 115 may initiate configuration changes to remedy any errors detected in advertisement splicing. For example, the centralized verification system 115 may initiate configuration changes to correct splice timing offsets to one or more advertisement splicers or trigger network changes to the underlying video network.

Advertisement media may be identified by a unique identifier such as a name, alpha-numeric identifier, or media fingerprint. In embodiments, the centralized verification system 115 may be configured with or may retrieve a media fingerprint associated with an advertisement media. The media fingerprint may be a sample or segment of the advertisement media, and the centralized verification system 115 may use the media fingerprint to identify advertisement media that is identified within tag information received from a remote probe 110.

Remote probes 110 may be stand-alone, external devices that are connected to a network element and/or remote probes 110 may be embedded within network elements. While various example placements of remote probes 110 are shown in FIG. 1, it should be understood that a remote probe 110 may be placed at any point along a path for delivering advertisement media from a source (e.g., advertisement media source 125) to a user device (e.g., CPE (customer premise equipment) device 160, IP device 165, or other user equipment). For example, remote probes may be connected to or embedded within a splicer (150), an edge device 170, a QAM device 180, a CPE device 160, an IP device 165, or any other device or network element that may reside within a network utilized to deliver advertisement media to a user.

Figure 2:
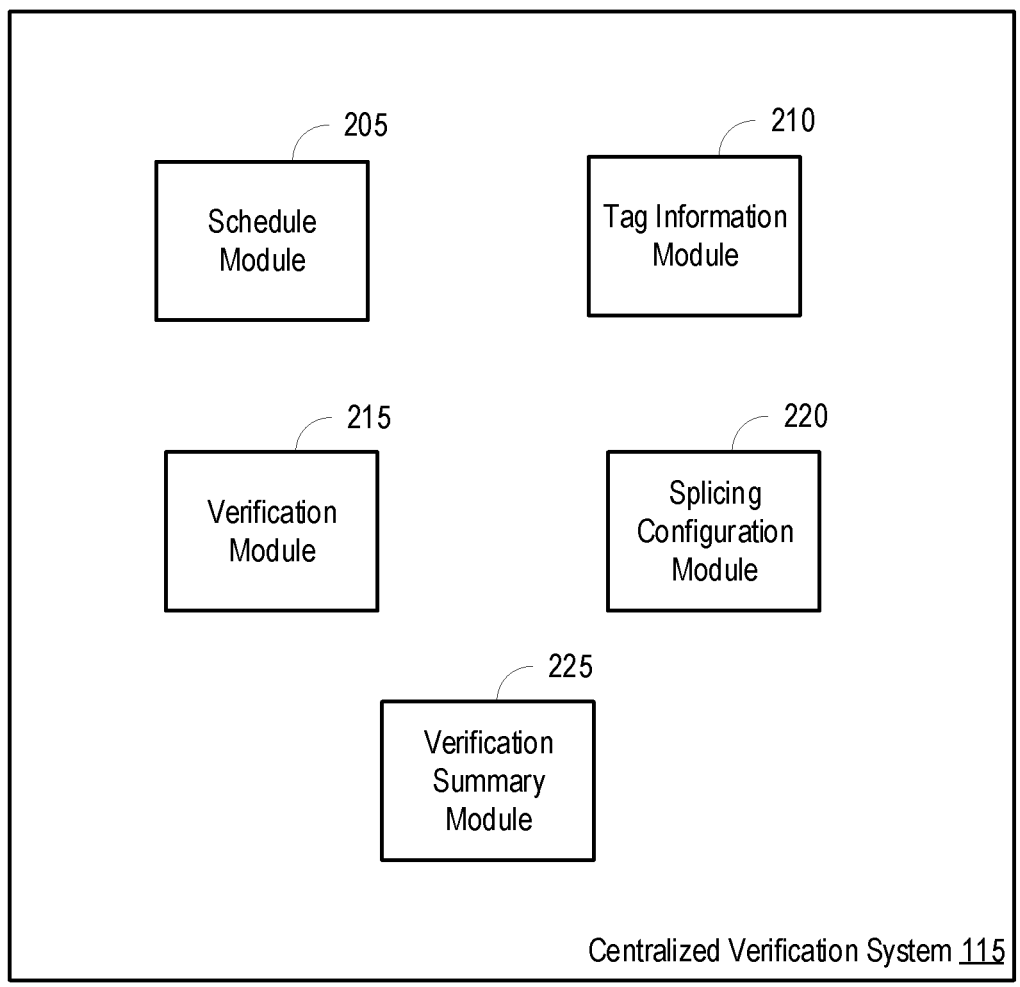
FIG. 2 is a block diagram illustrating an example centralized verification system operable to facilitate real-time advertisement verification.

FIG. 2 is a block diagram illustrating an example centralized verification system 115 operable to facilitate real-time advertisement verification. The centralized verification system 115 may include a schedule module 205, a tag information module 210, a verification module 215, a splicing configuration module 220, and a verification summary module 225.

In embodiments, the schedule module 205 may receive advertisement tag/profile information, advertisement scheduling information (e.g., advertisement splice schedules), and network configuration information from an advertisement tagging system 105 of FIG. 1 and/or an advertisement schedule source 155 of FIG. 1. The tag information module 210 may receive tag information (e.g., one or more captured tag identifiers, advertisement splice media files, tag identifier/ad media capture information, etc.) from one or more remote probes 110 of FIG. 1.

The verification module 215 may then electronically verify that appropriate advertisements were spliced into expected live/linear channels. In embodiments, the centralized verification system 115 may enable manual review and verification of advertisement splicing. For example, the verification summary module 225 may generate and output a display showing the embedded SCTE-35 markers, embedded timecode, video and audio. In embodiments, the centralized verification system 115 may initiate configuration changes to remedy any errors detected in advertisement splicing. For example, the splicing configuration module 220 may initiate configuration changes to correct splice timing offsets to one or more advertisement splicers or trigger network changes to the underlying video network.

Advertisement media may be identified by a unique identifier such as a name, alpha-numeric identifier, or media fingerprint. In embodiments, the schedule module 205 may be configured with or may retrieve a media fingerprint associated with an advertisement media. The media fingerprint may be a sample or segment of the advertisement media, and the verification module 215 may use the media fingerprint to identify advertisement media that is identified within tag information received from a remote probe 110.

Figure 3:
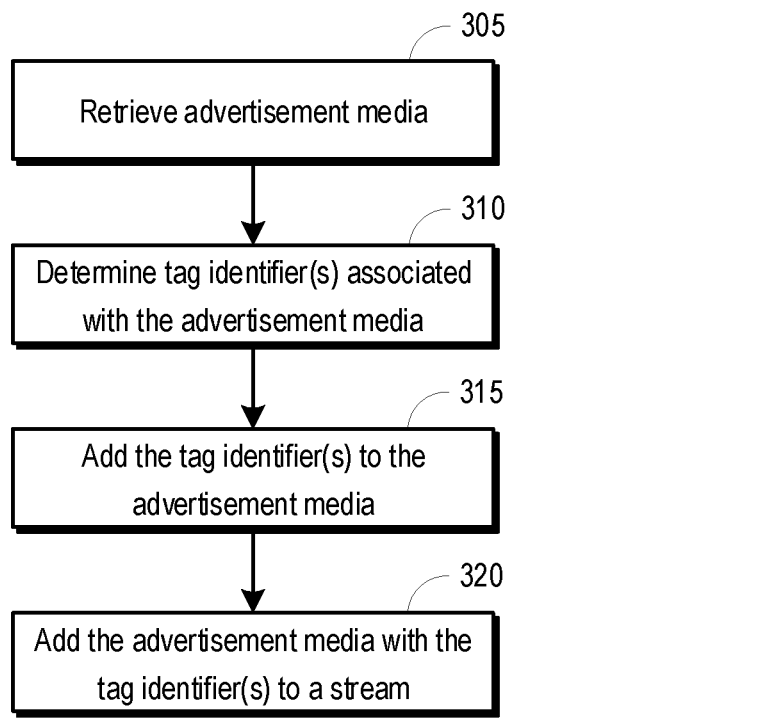
FIG. 3 is a flowchart illustrating an example process operable to facilitate tagging of advertisement media.

FIG. 3 is a flowchart illustrating an example process 300 operable to facilitate tagging of advertisement media. The process 300 may start at 305 when advertisement media is retrieved. Advertisement media may be retrieved, for example, by an advertisement tagging system 105 of FIG. 1. In embodiments, the advertisement media may be retrieved from an advertisement media source (e.g., advertisement media source 125 of FIG. 1).

At 310, one or more tag identifiers associated with the advertisement media may be determined. The one or more tag identifiers may be determined, for example, by the advertisement tagging system 105. In embodiments, the tag identifiers may include identification information associated with the advertisement media (e.g., unique identifier, genre, summary, content, media fingerprint, source, and/or other information associated with the advertisement media), delivery and/or schedule information associated with the advertisement media (e.g., geographic/regional delivery information, targeting profiles, stream workflow, etc.), identification of a callback server that is to receive tag information captured by remote probes, scheduled capture request information (e.g., record start and stop times), and/or other information. Tag identifiers may be determined based upon metadata identified from the advertisement media, settings configured at the advertisement tagging system 105, schedule information retrieved from an advertisement schedule source 155 of FIG. 1, and/or tagging information retrieved from a centralized verification system 115 of FIG. 1.

At 315, the one or more determined tag identifiers may be added to the advertisement media. The one or more determined tag identifiers may be added to the advertisement media, for example, by the advertisement tagging system 105. In embodiments, the tag identifiers may be placed in IP stream fields or MPEG stream fields, or the tag identifiers may be encoded into the advertisement media.

At 320, the advertisement media with the one or more determined tag identifiers may be added to a stream. In embodiments, the tagged advertisement media (e.g., the advertisement media with the tag identifiers) may be output from the advertisement tagging system 105 for placement into a stream that is then delivered to one or more targeted regions or devices.

Figure 4:
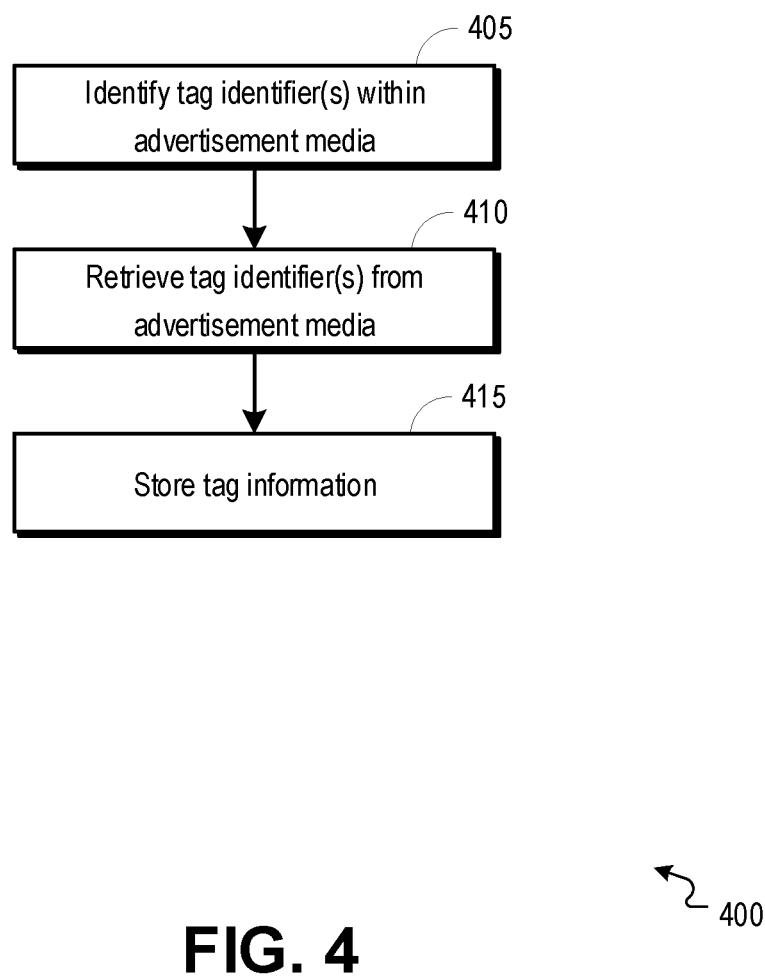
FIG. 4 is a flowchart illustrating an example process operable to facilitate a retrieval and storing of one or more tag identifiers.

FIG. 4 is a flowchart illustrating an example process 400 operable to facilitate a retrieval and storing of one or more tag identifiers. The process 400 may start at 405 when one or more tag identifiers are identified within advertisement media. The one or more tag identifiers may be identified, for example, by a remote probe 110 of FIG. 1. In embodiments, the remote probe 110 may detect and identify the one or more tag identifiers being carried within advertisement media. For example, the remote probe 110 may detect and identify the one or more tag identifiers from an IP stream or MPEG stream field. In embodiments, the remote probe 110 may decode advertisement media to identify one or more tag identifiers that are encoded in the advertisement media. In embodiments, the remote probe 110 may capture the one or more tag identifiers in response to a notification or capture request that is received by the remote probe 110 from an advertisement tagging system 105 of FIG. 1 or centralized verification system 115 of FIG. 1.

At 410, the one or more tag identifiers may be retrieved from the advertisement media. The one or more tag identifiers may be retrieved, for example, by the remote probe 110. In embodiments, the remote probe 110 may retrieve or copy the one or more tag identifiers from an IP stream or MPEG stream field. In embodiments, the remote probe 110 may decode advertisement media to retrieve one or more tag identifiers that are encoded in the advertisement media. In embodiments, the remote probe 110 may capture the one or more tag identifiers in response to a notification or capture request that is received by the remote probe 110 from an advertisement tagging system 105 of FIG. 1 or centralized verification system 115 of FIG. 1. For example, the remote probe 110 may record a certain segment of the advertisement media.

At 415, tag information may be stored. The tag information may be stored, for example, by the remote probe 110. In embodiments, the tag information may be stored at the remote probe 110 or at a device with which the remote probe 110 is associated. The tag information may include the one or more tag identifiers retrieved from the advertisement media, information associated with the remote probe 110 (e.g., unique identifier, geographical and/or network location information, associated region or market, etc.), tag capture information (e.g., time at which the tag identifiers were retrieved), all or part of advertisement media recorded by the remote probe 110, and/or other information.

Figure 5:
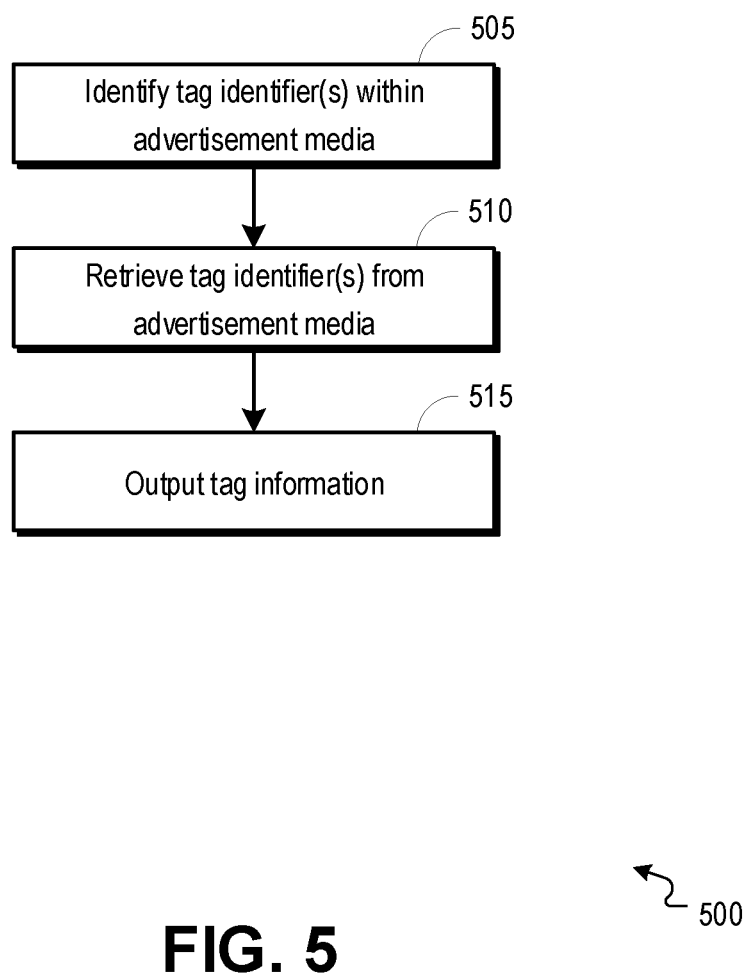
FIG. 5 is a flowchart illustrating an example process operable to facilitate a retrieval and output of one or more tag identifiers.

FIG. 5 is a flowchart illustrating an example process 500 operable to facilitate a retrieval and output of one or more tag identifiers. The process 500 may start at 505 when one or more tag identifiers are identified within advertisement media. The one or more tag identifiers may be identified, for example, by a remote probe 110 of FIG. 1. In embodiments, the remote probe 110 may detect and identify the one or more tag identifiers being carried within advertisement media. For example, the remote probe 110 may detect and identify the one or more tag identifiers from an IP stream or MPEG stream field. In embodiments, the remote probe 110 may decode advertisement media to identify one or more tag identifiers that are encoded in the advertisement media. In embodiments, the remote probe 110 may capture the one or more tag identifiers in response to a notification or capture request that is received by the remote probe 110 from an advertisement tagging system 105 of FIG. 1 or centralized verification system 115 of FIG. 1.

At 510, the one or more tag identifiers may be retrieved from the advertisement media. The one or more tag identifiers may be retrieved, for example, by the remote probe 110. In embodiments, the remote probe 110 may retrieve or copy the one or more tag identifiers from an IP stream or MPEG stream field. In embodiments, the remote probe 110 may decode advertisement media to retrieve one or more tag identifiers that are encoded in the advertisement media. In embodiments, the remote probe 110 may capture the one or more tag identifiers in response to a notification or capture request that is received by the remote probe 110 from an advertisement tagging system 105 of FIG. 1 or centralized verification system 115 of FIG. 1. For example, the remote probe 110 may record a certain segment of the advertisement media.

At 515, tag information may be output. For example, the remote probe 110 may output the tag information to a centralized verification system 115 of FIG. 1 or to another system or server. In embodiments, the remote probe 110 may be configured with a locator of a callback server (e.g., the centralized verification system 115 or other system or server), and the remote probe 110 may package and output the tag information to the callback server. In embodiments, the remote probe may identify a locator of a callback server (e.g., the centralized verification system 115 or other system or server) from the one or more tag identifiers, and the remote probe 110 may package and output the tag information to the callback server. The tag information may include the one or more tag identifiers retrieved from the advertisement media, information associated with the remote probe 110 (e.g., unique identifier, geographical and/or network location information, associated region or market, etc.), tag capture information (e.g., time at which the tag identifiers were retrieved), all or part of advertisement media recorded by the remote probe 110, and/or other information.

Figure 6:
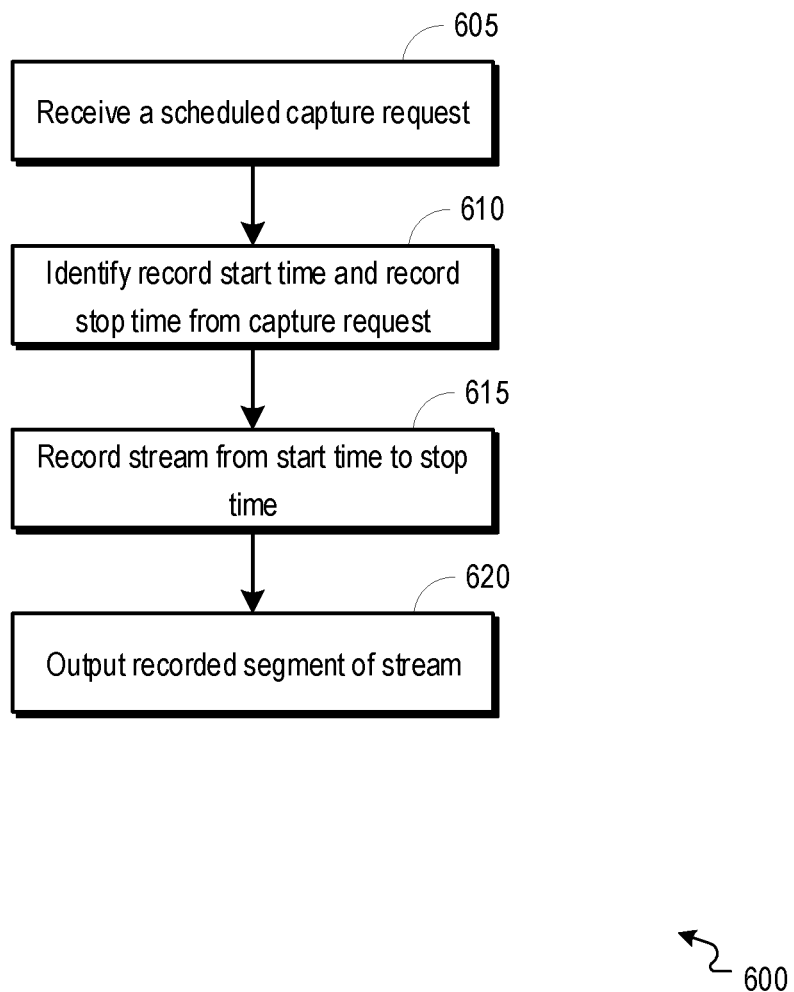
FIG. 6 is a flowchart illustrating an example process operable to facilitate a capture and output of segment of a stream.

FIG. 6 is a flowchart illustrating an example process 600 operable to facilitate a capture and output of segment of a stream. The process 600 may start at 605 when a scheduled capture request is received. The scheduled capture request may be received, for example, by a remote probe 110 of FIG. 1. In embodiments, the scheduled capture request may be received from an advertisement tagging system 105 of FIG. 1 or a centralized verification system 115 of FIG. 1. The scheduled capture request may include an identification of a channel or stream to be recorded, a record start time, and a record stop time.

At 610, a record start time and a record stop time may be identified from the scheduled capture request. The record start time and record stop time may be identified, for example, by the remote probe 110.

At 615, a stream or channel may be recorded from the record start time to the record stop time. The stream or channel may be recorded, for example, by the remote probe 110. In embodiments, the remote probe 110 may initiate a recording of the stream or channel (e.g., the stream or channel identified within the scheduled capture request) at the identified record start time and terminate the recording at the identified record stop time.

At 620, the recorded segment of the stream may be output. For example, the remote probe 110 may output the recorded segment of the stream to a centralized verification system 115. In embodiments, the remote probe 110 may package the segment of the stream captured from the record start time to the record stop time, and the remote probe 110 may output the captured segment of the stream.

Figure 7:
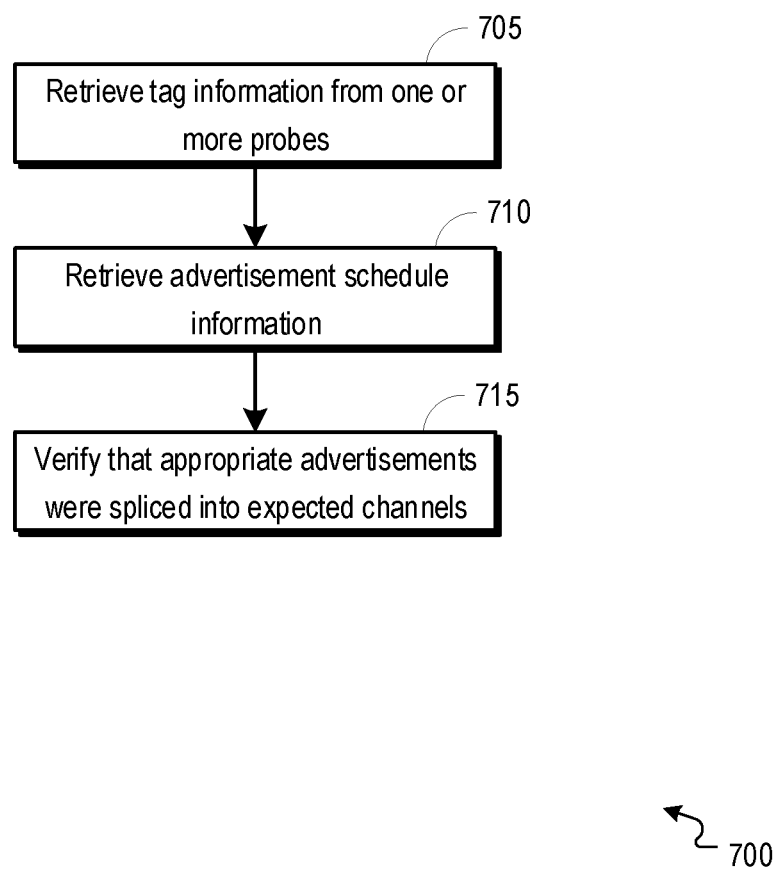
FIG. 7 is a flowchart illustrating an example process operable to facilitate a verification of advertisement splicing.

FIG. 7 is a flowchart illustrating an example process 700 operable to facilitate a verification of advertisement splicing. The process 700 may start at 705 when tag information is retrieved from one or more probes. For example, a centralized verification system 115 of FIG. 1 may retrieve the tag information from one or more remote probes 110 of FIG. 1. In embodiments, the centralized verification system 115 may request tag information from the one or more remote probes 110 or the centralized verification system 115 may receive the tag information from one or more active remote probes 110 in response to one or more tag identifiers being retrieved at the one or more active remote probes 110. The tag information may include one or more tag identifiers retrieved by the one or more probes 110 from advertisement media, information associated with the one or more remote probes 110 (e.g., unique identifier, geographical and/or network location information, associated region or market, etc.), tag capture information (e.g., time at which the tag identifiers were retrieved by the one or more remote probes 110), all or part of advertisement media recorded by the one or more remote probes 110, and/or other information. In embodiments, the centralized verification system 115 may output a request for tag information associated with tag identifiers that are associated with a specific advertisement media. For example, an operator may request tag information associated with a specific advertisement media.

At 710, advertisement schedule information may be retrieved. The advertisement schedule information may be retrieved, for example, by the centralized verification system 115. The advertisement schedule information may be retrieved from an advertisement schedule source 155 of FIG. 1. In embodiments, the advertisement schedule information may include a unique identifier associated with a specific advertisement media (e.g., a name or alpha-numeric identifier, a media fingerprint, etc.), expected placement data associated with the advertisement media (e.g., an expected date, time, region, channel/stream, targeted device/profile for which the advertisement media is to be placed), and/or other information. In embodiments, the centralized verification system 115 may retrieve advertisement schedule information that is associated with advertisement media that is identified from the retrieved tag information.

At 715, a verification may be made that appropriate advertisement media was spliced into expected channels. Verification of correct advertisement media placement may be made, for example, by the centralized verification system 115. In embodiments, the centralized verification system 115 may compare the retrieved tag information to the retrieved advertisement schedule information, and the centralized verification system 115 may determine that advertisement media identified within the tag information and/or advertisement schedule information was spliced into an expected channel/stream at an expected date and time. Using the identifier and placement information retrieved from the tag information and the identifier and placement information retrieved from the advertisement schedule information, the centralized verification system 115 may verify that appropriate/correct advertisement media was delivered within an appropriate channel/stream, at an appropriate date and time, and to an appropriate region, profile, and/or device. Based upon a time of tag identifier capture (e.g., tag identifier capture information identified from the tag information) and an expected duration of advertisement media (e.g., duration of advertisement media identified from the advertisement schedule information), the centralized verification system 115 may verify that the entirety of the advertisement media was spliced into a channel or stream.

Figure 8:
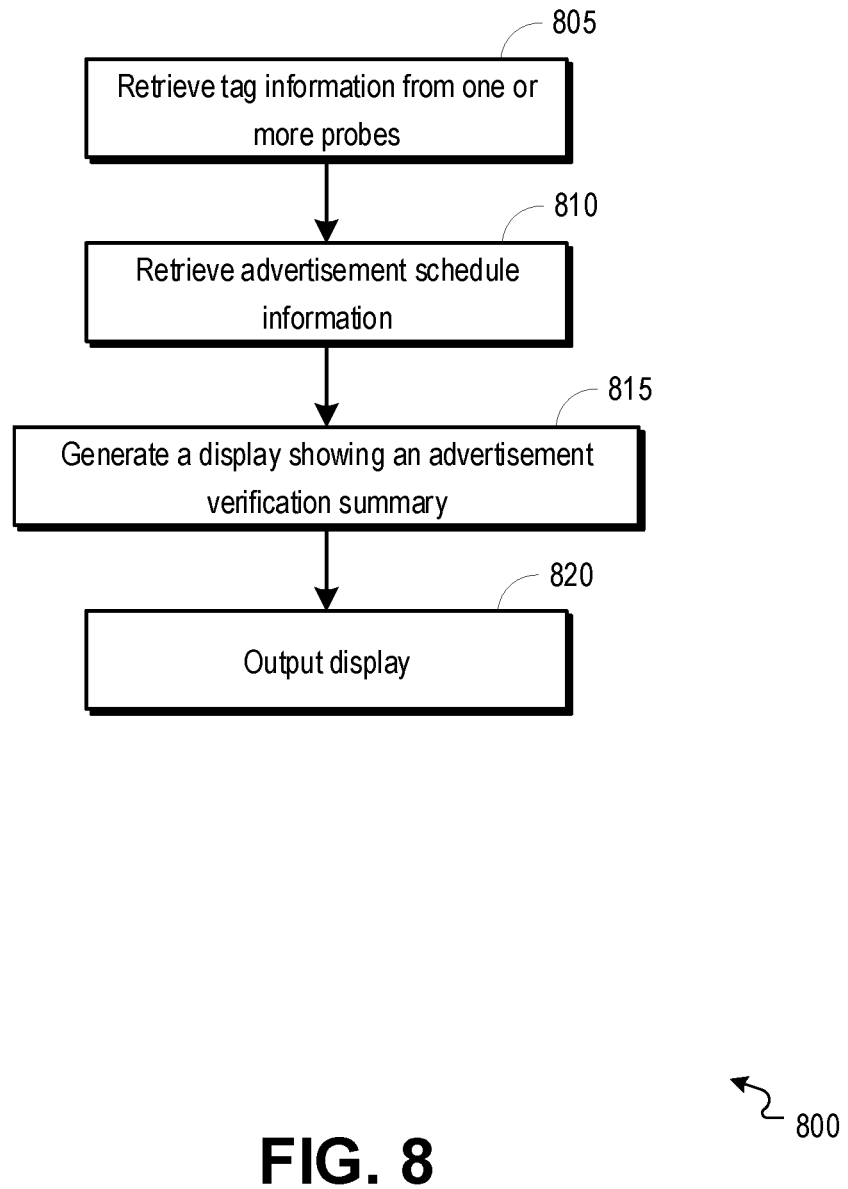
FIG. 8 is a flowchart illustrating an example process operable to facilitate an output of an advertisement verification summary.

FIG. 8 is a flowchart illustrating an example process 800 operable to facilitate an output of an advertisement verification summary. The process 800 may start at 805 when tag information is retrieved from one or more probes. For example, a centralized verification system 115 of FIG. 1 may retrieve the tag information from one or more remote probes 110 of FIG. 1. In embodiments, the centralized verification system 115 may request tag information from the one or more remote probes 110 or the centralized verification system 115 may receive the tag information from one or more active remote probes 110 in response to one or more tag identifiers being retrieved at the one or more active remote probes 110. The tag information may include one or more tag identifiers retrieved by the one or more probes 110 from advertisement media, information associated with the one or more remote probes 110 (e.g., unique identifier, geographical and/or network location information, associated region or market, etc.), tag capture information (e.g., time at which the tag identifiers were retrieved by the one or more remote probes 110), all or part of advertisement media recorded by the one or more remote probes 110, and/or other information.

At 810, advertisement schedule information may be retrieved. The advertisement schedule information may be retrieved, for example, by the centralized verification system 115. The advertisement schedule information may be retrieved from an advertisement schedule source 155 of FIG. 1. In embodiments, the advertisement schedule information may include a unique identifier associated with a specific advertisement media (e.g., a name or alpha-numeric identifier, a media fingerprint, etc.), expected placement data associated with the advertisement media (e.g., an expected date, time, region, channel/stream, targeted device/profile for which the advertisement media is to be placed), and/or other information.

At 815, a display showing an advertisement verification summary may be generated. The display showing the advertisement verification summary may be generated, for example, by the centralized verification system 115. In embodiments, the display may include displays of the retrieved tag information and/or the retrieved advertisement schedule information. In embodiments, the display may include a report or grade summarizing whether, based on a comparison between the tag information and the advertisement schedule information, correct/appropriate advertisement media was spliced into correct/ appropriate streams/ channels. For example, the display may include a verification that advertisement media was correctly spliced into streams/channels (e.g., tag information matches advertisement schedule information), or the display may include an identification of one or more errors in splicing of the advertisement media (e.g., an identification of discrepancies between the tag information and the advertisement schedule information).

At 820, the generated display may be output. The generate display may be output, for example, by the centralized verification system 115. In embodiments, the display may be output to a display device for manual review by a user (e.g., operator).

Figure 9:
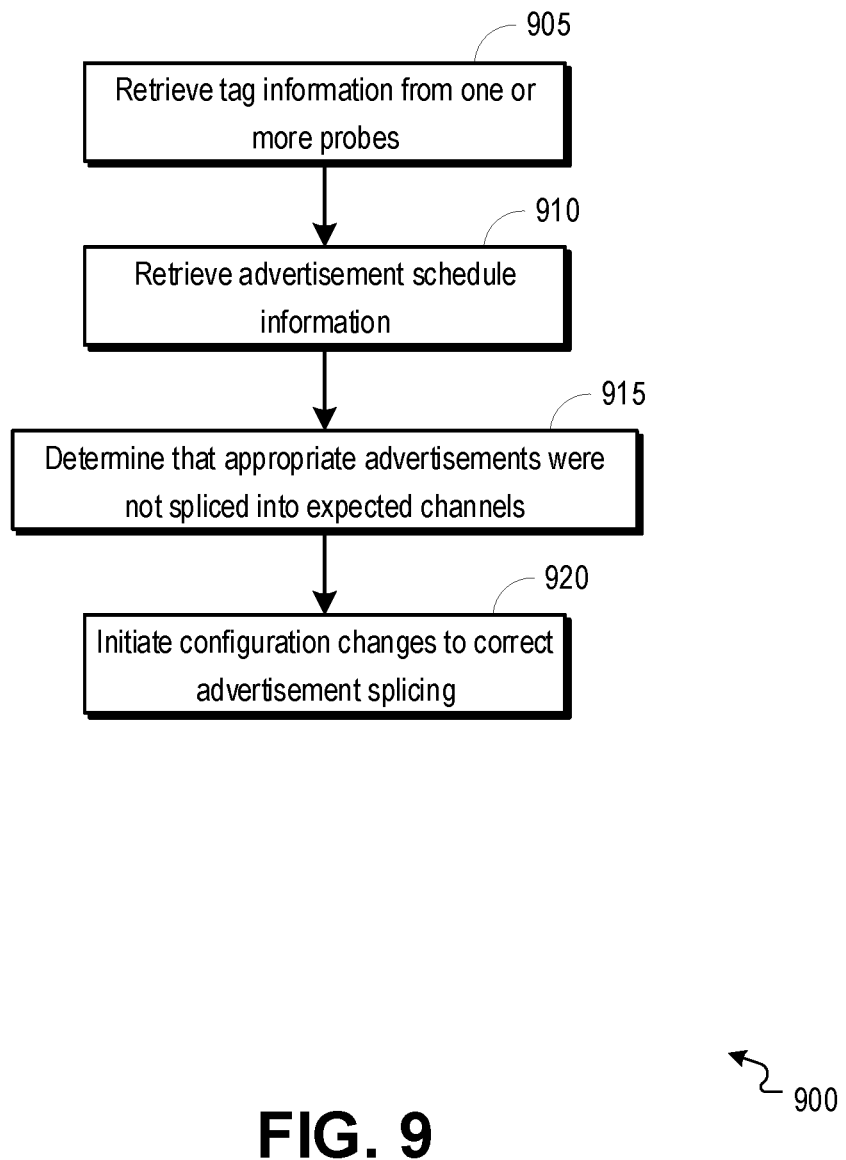
FIG. 9 is a flowchart illustrating an example process operable to facilitate an initiation of configuration changes to correct advertisement splicing.

FIG. 9 is a flowchart illustrating an example process 900 operable to facilitate an initiation of configuration changes to correct advertisement splicing. The process 900 may start at 905 when tag information is retrieved from one or more probes. For example, a centralized verification system 115 of FIG. 1 may retrieve the tag information from one or more remote probes 110 of FIG. 1. In embodiments, the centralized verification system 115 may request tag information from the one or more remote probes 110 or the centralized verification system 115 may receive the tag information from one or more active remote probes 110 in response to one or more tag identifiers being retrieved at the one or more active remote probes 110. The tag information may include one or more tag identifiers retrieved by the one or more probes 110 from advertisement media, information associated with the one or more remote probes 110 (e.g., unique identifier, geographical and/or network location information, associated region or market, etc.), tag capture information (e.g., time at which the tag identifiers were retrieved by the one or more remote probes 110), all or part of advertisement media recorded by the one or more remote probes 110, and/or other information.

At 910, advertisement schedule information may be retrieved. The advertisement schedule information may be retrieved, for example, by the centralized verification system 115. The advertisement schedule information may be retrieved from an advertisement schedule source 155 of FIG. 1. In embodiments, the advertisement schedule information may include a unique identifier associated with a specific advertisement media (e.g., a name or alpha-numeric identifier, a media fingerprint, etc.), expected placement data associated with the advertisement media (e.g., an expected date, time, region, channel/stream, targeted device/profile for which the advertisement media is to be placed), and/or other information.

At 915, a determination may be made that appropriate advertisement media was not spliced into expected channels. The determination of an incorrect advertisement media placement may be made, for example, by the centralized verification system 115. In embodiments, the centralized verification system 115 may compare the retrieved tag information to the retrieved advertisement schedule information, and the centralized verification system 115 may determine that advertisement media identified within the tag information and/or advertisement schedule information was not spliced into an expected channel/stream at an expected date and time. Using the identifier and placement information retrieved from the tag information and the identifier and placement information retrieved from the advertisement schedule information, the centralized verification system 115 may determine that appropriate/correct advertisement media was not delivered within an appropriate channel/ stream, at an appropriate date and time, and/or to an appropriate region, profile, and/or device. Based upon a time of tag identifier capture (e.g., tag identifier capture information identified from the tag information) and an expected duration of advertisement media (e.g., duration of advertisement media identified from the advertisement schedule information), the centralized verification system 115 may determine that the entirety of the advertisement media was not spliced into a channel or stream.

At 920, configuration changes to correct advertisement splicing may be initiated. The configuration changes may be initiated, for example, by centralized verification system 115. In embodiments, the centralized verification system 115 may output a notification (e.g., to an operator via a display screen or message) that a change in the delivery of the advertisement media is needed. For example, the notification may inform an operator that the advertisement media was placed into a wrong channel/stream, and the notification may identify a correct channel/stream within which the advertisement media should be placed. In embodiments, the centralized verification system 115 may automatically initiate a change or adjustment in the delivery of the advertisement media. For example, the centralized verification system 115 may output instructions to a splicer to adjust splicing offsets to accommodate the duration of the advertisement media.

Figure 10:
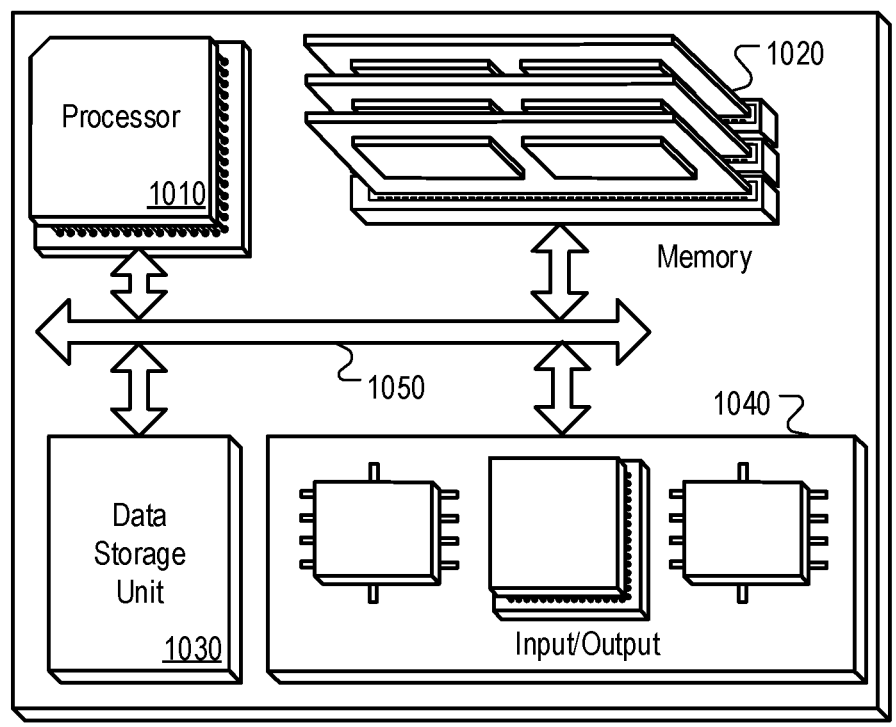
FIG. 10 is a block diagram of a hardware configuration operable to facilitate real-time advertisement verification.

FIG. 10 is a block diagram of a hardware configuration 1000 operable to facilitate real-time advertisement verification. The hardware configuration 1000 can include a processor 1010, a memory 1020, a storage device 1030, and an input/ output device 1040. Each of the components 1010, 1020, 1030, and 1040 can, for example, be interconnected using a system bus 1050. The processor 1010 can be capable of processing instructions for execution within the hardware configuration 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

The memory 1020 can store information within the hardware configuration 1000. In one implementation, the memory 1020 can be a computer-readable medium. In one implementation, the memory 1020 can be a volatile memory unit. In another implementation, the memory 1020 can be a non-volatile memory unit.

In some implementations, the storage device 1030 can be capable of providing mass storage for the hardware configuration 1000. In one implementation, the storage device 1030 can be a computer-readable medium. In various different implementations, the storage device 1030 can, for example, include a hard disk device, an optical disk device, flash memory or some other large capacity storage device. In other implementations, the storage device 1030 can be a device external to the hardware configuration 1000.

The input/output device 1040 provides input/output operations for the hardware configuration 1000. In embodiments, the input/output device 1040 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to delivery devices and/or user devices (e.g., CPE device, IP device, or other user equipment). In embodiments, the input/output device can include driver devices configured to send communications to, and receive communications from an advertisement media source, an advertisement schedule source, an advertisement tagging system, remote probe(s), and/or a CDN.

Those skilled in the art will appreciate that the invention improves upon methods and systems for verifying appropriate placement of advertisement media. Methods, systems, and computer readable media can be operable to facilitate real-time advertisement verification. Advertisement media may be tagged with one or more tag identifiers. One or more remote probes may retrieve tag identifier(s) from advertisement media and output tag information to a centralized verification system. The centralized verification system may compare tag information retrieved from remote probes to expected advertisement placement parameters. The centralized verification system may verify that appropriate advertisement media has been spliced into expected channels or streams. When a splicing error has been detected, the centralized verification system may initiate changes to correct the splicing error.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method performed automatically by a computer processor operatively connected to a splicer that splices one or more advertisements into a linear media broadcast stream, the method comprising:
    retrieving tag information from one or more remote probes, the tag information retrieved automatically from data embedded in an advertisement as it is delivered in the linear media broadcast stream through a content delivery network;
    retrieving advertisement schedule information associated with advertisement media identified from the tag information;
    comparing the tag information to the advertisement schedule information;
    if the tag information matches the advertisement schedule information, confirming that advertisement media associated with the tag information was correctly spliced into one or more expected channels; and
    if the tag information does not match the advertisement schedule information, causing configuration changes in the splicer to correct placement of the advertisement media.

2. The method of claim 1, wherein the tag information is requested from the one or more remote probes.

3. The method of claim 1, wherein the tag information is output from the one or more remote probes in response to a retrieval, at the one or more remote probes, of one or more tag identifiers.

4. The method of claim 1, wherein the tag information comprises a recorded segment of the advertisement media identified from the tag information.

5. The method of claim 1, wherein the tag information comprises a time and date at which one or more tag identifiers were captured by the one or more remote probes.

6. The method of claim 1, wherein the advertisement schedule information comprises a media fingerprint associated with the advertisement media identified from the tag information.

7. The method of claim 1, wherein initiating configuration changes to correct placement of the advertisement media comprises initiating an adjustment of advertisement splicing offsets at a splicer.

8. A system comprising one or more computer processing modules operatively connected to a splicer that splices one or more advertisements into a linear media broadcast stream, and that:
    retrieve tag information from one or more remote probes, the tag information retrieved from data embedded in an advertisement as it is delivered in the linear media broadcast through a content delivery network;
    retrieve advertisement schedule information associated with advertisement media identified from the tag information;
    compare the tag information to the advertisement schedule information;
    if the tag information matches the advertisement schedule information, confirm that advertisement media associated with the tag information was correctly spliced into one or more expected channels; and
    if the tag information does not match the advertisement schedule information, cause configuration changes in the splicer to correct placement of the advertisement media.

9. The system of claim 8, wherein the tag information is requested from the one or more remote probes.

10. The system of claim 8, wherein the tag information is output from the one or more remote probes in response to a retrieval, at the one or more remote probes, of one or more tag identifiers.

11. The system of claim 8, wherein the tag information comprises a recorded segment of the advertisement media identified from the tag information.

12. The system of claim 8, wherein the tag information comprises a time and date at which one or more tag identifiers were captured by the one or more remote probes.

13. The system of claim 8, wherein the advertisement schedule information comprises a media fingerprint associated with the advertisement media identified from the tag information.

14. One or more non-transitory computer readable media operable to execute on a processor operatively connected to a splicer that splices one or more advertisements into a linear media broadcast stream, the computer readable media being operable to cause the processor to perform the operations comprising:
    retrieving tag information from one or more remote probes, the tag information retrieved from data embedded in an advertisement as it is delivered in the linear media broadcast through a content delivery network;
    retrieving advertisement schedule information associated with advertisement media identified from the tag information;
    comparing the tag information to the advertisement schedule information;

if the tag information matches the advertisement schedule information, confirming that advertisement media associated with the tag information was correctly spliced into one or more expected channels; and if the tag information does not match the advertisement schedule information, causing configuration changes in the splicer to correct placement of the advertisement media.

15. The one or more non-transitory computer-readable media of claim 14, wherein the tag information is requested from the one or more remote probes.

16. The one or more non-transitory computer-readable media of claim 14, wherein the tag information is output from the one or more remote probes in response to a retrieval, at the one or more remote probes, of one or more tag identifiers.

17. The one or more non-transitory computer-readable media of claim 14, wherein the tag information comprises a recorded segment of the advertisement media identified from the tag information.

18. The one or more non-transitory computer-readable media of claim 14, wherein the tag information comprises a time and date at which one or more tag identifiers were captured by the one or more remote probes.

19. The one or more non-transitory computer-readable media of claim 14, wherein the advertisement schedule information comprises a media fingerprint associated with the advertisement media identified from the tag information.

20. The one or more non-transitory computer-readable media of claim 14, wherein initiating configuration changes to correct placement of the advertisement media comprises initiating an adjustment of advertisement splicing offsets at a splicer.

* * * * *